US010051539B2

(12) United States Patent
Zhang et al.

(10) Patent No.: US 10,051,539 B2
(45) Date of Patent: Aug. 14, 2018

(54) ACCESS NETWORK OFFLOADING METHOD, DEVICE, AND SYSTEM

(71) Applicant: Huawei Technologies Co., Ltd., Shenzhen, Guangdong (CN)

(72) Inventors: Hongzhuo Zhang, Shanghai (CN); Tianle Deng, Shanghai (CN); Huan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 15/160,696

(22) Filed: May 20, 2016

(65) Prior Publication Data

US 2016/0269960 A1  Sep. 15, 2016

Related U.S. Application Data

(63) Continuation of application No. PCT/CN2013/087711, filed on Nov. 22, 2013.

(51) Int. Cl.
*H04W 36/22* (2009.01)
*H04W 28/08* (2009.01)
(Continued)

(52) U.S. Cl.
CPC ........... *H04W 36/22* (2013.01); *H04L 61/103* (2013.01); *H04L 61/2007* (2013.01); *H04L 61/6022* (2013.01); *H04W 28/08* (2013.01); *H04W 36/08* (2013.01); *H04W 36/28* (2013.01); *H04W 76/11* (2018.02); *H04W 36/14* (2013.01); *H04W 84/042* (2013.01); *H04W 84/12* (2013.01); *H04W 88/08* (2013.01)

(58) Field of Classification Search
None
See application file for complete search history.

(56) References Cited

U.S. PATENT DOCUMENTS

2013/0122910 A1* 5/2013 Singh .................... H04W 36/18
455/437
2014/0079007 A1* 3/2014 Li ......................... H04W 28/10
370/329
(Continued)

FOREIGN PATENT DOCUMENTS

CN   101415248 A   4/2009
CN   103209440 A   7/2013
(Continued)

*Primary Examiner* — Chi H Pham
*Assistant Examiner* — Vladislav Agureyev

(57) ABSTRACT

The embodiments of the present invention provide an access network offloading method, a device, and a system. The method includes: sending, by UE, a UE identifier and WiFi information of the UE to a base station, where the WiFi information includes a WiFi MAC ID of the UE; and searching, by the UE, for a wireless local area network WLAN signal, when an accessible WLAN network is found, sending an access request including the WiFi MAC ID of the UE to an access point of the WLAN network: WLAN AP, accessing the WLAN network, and enabling the WLAN AP to send the WiFi MAC ID of the UE to the base station, so that the base station performs matching according to the association relationship between the UE identifier of the UE and the WiFi MAC ID of the UE, and starts offloading the UE.

12 Claims, 7 Drawing Sheets

(51) Int. Cl.
*H04L 29/12* (2006.01)
*H04W 36/08* (2009.01)
*H04W 36/28* (2009.01)
*H04W 76/11* (2018.01)
*H04W 36/14* (2009.01)
*H04W 84/04* (2009.01)
*H04W 84/12* (2009.01)
*H04W 88/08* (2009.01)

(56) References Cited

U.S. PATENT DOCUMENTS

| | | | |
|---|---|---|---|
| 2014/0087748 A1* | 3/2014 | Hong | H04W 72/1215 |
| | | | 455/452.1 |
| 2014/0200008 A1* | 7/2014 | Wang | H04W 36/22 |
| | | | 455/438 |
| 2014/0341038 A1 | 11/2014 | Lim | |
| 2015/0189547 A1* | 7/2015 | Forssell | H04L 63/101 |
| | | | 370/235 |
| 2016/0255539 A1* | 9/2016 | Mizukoshi | H04W 36/0072 |
| | | | 370/329 |
| 2017/0223600 A1* | 8/2017 | Jeong | H04W 36/26 |

FOREIGN PATENT DOCUMENTS

| | | |
|---|---|---|
| CN | 103368863 A | 10/2013 |
| CN | 103379542 A | 10/2013 |
| EP | 2840815 A1 | 2/2015 |
| EP | 2945321 A1 | 11/2015 |
| WO | 2013/100629 A1 | 7/2013 |

\* cited by examiner

ACCESS NETWORK OFFLOADING METHOD, DEVICE, AND SYSTEM

CROSS-REFERENCE TO RELATED APPLICATIONS

This application is a continuation of International Application No. PCT/CN2013/087711, filed on Nov. 22, 2013, which is hereby incorporated by reference in its entirety.

TECHNICAL FIELD

Embodiments of the present invention relates to communications technologies, and in particular, to an access network offloading method, a device, and a system.

BACKGROUND

Currently, due to rapid development of an intelligent terminal and a mobile application, mobile data traffic increases dramatically, and consequently, it is increasingly difficult for a live network to meet a requirement of increased data traffic. Therefore, a mobile operator hopes to use a non-cellular network to carry a part of traffic of the live network, to offload traffic of the live network. Interworking between a 3rd Generation Partnership Project (3GPP for short) network and a non-3GPP network, for example, interworking between an LTE network and a wireless local area network (Wireless Local Area Network, WLAN for short), is a current research hot topic.

A traffic offloading method is generally that a node on a radio access network (RAN for short) side triggers user balancing between a 3GPP network and a WLAN network or balancing of multiple bearers or multiple Internet Protocol (IP for short) flows of a user according to a load status and a status of a WLAN AP in a region in which a UE is located.

In the prior art, to implement offloading between a 3GPP network and a WLAN, generally, an uplink detector (UL Detector) function is added to a WLAN AP to detect an uplink signal (UL Sounding) sent by the UE to a cellular network, so as to identify that the UE approaches the WLAN, thereby implementing load balancing between the 3GPP network and the WLAN. However, in this method, an uplink detector (UL Detector) needs to be added to the WLAN AP, which results in increased costs of the WLAN AP.

SUMMARY

Embodiments of the present invention provide an access network offloading method, a device, and a system, which implement offloading between a 3GPP network and a WLAN without increasing device costs.

According to a first aspect, an embodiment of the present invention provides an access network offloading method, including:

sending, by user equipment UE, a UE identifier and WiFi information of the UE to a base station, where the WiFi information includes a wireless local area network Media Access Control identifier WiFi MAC ID of the UE, so that the base station establishes an association relationship between the UE identifier of the UE and the WiFi MAC ID of the UE; and searching, by the UE, for a wireless local area network WLAN signal, when an accessible WLAN network is found, sending an access request including the WiFi MAC ID of the UE to an access point of the WLAN network: WLAN AP, accessing the WLAN network, and enabling the WLAN AP to send the WiFi MAC ID of the UE to the base station, so that the base station performs matching according to the association relationship between the UE identifier of the UE and the WiFi MAC ID of the UE, to obtain the UE identifier associated with the WiFi MAC ID, and starts offloading the UE.

In a first possible implementation manner of the first aspect, the WiFi information further includes a WiFi channel capacity and/or a WiFi function enabling status of the UE.

In a second possible implementation manner of the first aspect, the offloading of the UE includes:

bearer offloading or Internet Protocol IP flow offloading of the UE.

According to the first aspect or the first or second possible implementation manner of the first aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to a second aspect, an embodiment of the present invention provides an access network offloading method, including:

receiving, by a base station, a user equipment UE identifier and WiFi information of UE that are sent by the UE, where the WiFi information includes a WiFi MAC ID of the UE;

establishing, by the base station, an association relationship between the UE identifier of the UE and the WiFi MAC ID of the UE;

receiving, by the base station, the WiFi MAC ID of the UE that is sent by an access point of a wireless local area network WLAN: WLAN AP, where the WiFi MAC ID is sent to the WLAN AP by the UE when the UE accesses the WLAN network; and performing, by the base station, matching according to the association relationship between the UE identifier of the UE and the WiFi MAC ID of the UE, to obtain the UE identifier associated with the WiFi MAC ID sent by the WLAN AP, and starting offloading the UE.

In a first possible implementation manner of the second aspect, the WiFi information further includes a WiFi channel capacity and/or a WiFi function enabling status of the UE.

In a second possible implementation manner of the second aspect, the offloading includes:

bearer offloading or Internet Protocol IP flow offloading.

According to the second aspect or the first or second possible implementation manner of the second aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to a third aspect, an embodiment of the present invention provides an access network offloading method, including:

receiving, by an access point of a wireless local area network WLAN: WLAN AP, an access request sent by user equipment UE, where the access request includes a WiFi MAC ID of the UE; and sending, by the WLAN AP, the WiFi MAC ID of the UE to a base station, so that the base station performs matching according to an association relationship between a UE identifier of the UE and the WiFi MAC ID of the UE, to obtain the UE identifier associated with the WiFi MAC ID sent by the WLAN AP, and starts offloading the UE.

In a first possible implementation manner of the third aspect, the offloading includes:

bearer offloading or Internet Protocol IP flow offloading.

According to the third aspect or the first possible implementation manner of the third aspect, in a second possible implementation manner, the UE identifier includes:

a cell radio network temporary identity CRNTI, a system architecture evolution temporary mobile subscriber identity STMSI, or a temporary mobile subscriber identity TMSI of the UE.

According to a fourth aspect, an embodiment of the present invention provides user equipment UE, including:

a sending module, configured to send a UE identifier and WiFi information of the UE to a base station, where the WiFi information includes a wireless local area network Media Access Control identifier WiFi MAC ID of the UE, so that the base station establishes an association relationship between the UE identifier of the UE and the WiFi MAC ID of the UE; and a processing module, configured to search for a wireless local area network WLAN signal, where the sending module is further configured to: when an accessible WLAN network is found, send an access request including the WiFi MAC ID of the UE to an access point of the WLAN network: WLAN AP, access the WLAN network, and enable the WLAN AP to send the WiFi MAC ID of the UE to the base station, so that the base station performs matching according to the association relationship between the UE identifier of the UE and the WiFi MAC ID of the UE, to obtain the UE identifier associated with the WiFi MAC ID, and starts offloading the UE.

In a first possible implementation manner of the fourth aspect, the WiFi information further includes a WiFi channel capacity and/or a WiFi function enabling status of the UE.

In a second possible implementation manner of the fourth aspect, the offloading includes:

bearer offloading or Internet Protocol IP flow offloading.

According to the fourth aspect or the first or second possible implementation manner of the fourth aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to a fifth aspect, an embodiment of the present invention provides a base station, including:

a receiving module, configured to receive a user equipment UE identifier and WiFi information of UE that are sent by the UE, where the WiFi information includes a WiFi MAC ID of the UE; and a processing module, configured to establish an association relationship between the UE identifier of the UE and the WiFi MAC ID of the UE, where the receiving module is further configured to receive the WiFi MAC ID of the UE that is sent by an access point of a wireless local area network WLAN: WLAN AP, where the WiFi MAC ID is sent to the WLAN AP by the UE when the UE accesses the WLAN network; and the processing module is further configured to: perform matching according to the association relationship between the UE identifier of the UE and the WiFi MAC ID of the UE, to obtain the UE identifier associated with the WiFi MAC ID sent by the WLAN AP, and start offloading the UE.

In a first possible implementation manner of the fifth aspect, the WiFi information further includes a WiFi channel capacity and/or a WiFi function enabling status of the UE.

In a second possible implementation manner of the fifth aspect, the offloading includes:

bearer offloading or Internet Protocol IP flow offloading.

According to the fifth aspect or the first or second possible implementation manner of the fifth aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to a sixth aspect, an embodiment of the present invention provides an access point of a wireless local area network WLAN: WLAN AP, including:

a receiving module, configured to receive an access request sent by user equipment UE, where the access request includes a WiFi MAC ID of the UE; and a sending module, configured to send the WiFi MAC ID of the UE to a base station, so that the base station performs matching according to an association relationship between a UE identifier of the UE and the WiFi MAC ID of the UE, to obtain the UE identifier associated with the WiFi MAC ID sent by the WLAN AP, and starts offloading the UE.

In a first possible implementation manner of the sixth aspect, the offloading includes:

bearer offloading or Internet Protocol IP flow offloading.

According to the sixth aspect or the first possible implementation manner of the sixth aspect, in a second possible implementation manner, the UE identifier includes:

a cell radio network temporary identity CRNTI, a system architecture evolution temporary mobile subscriber identity STMSI, or a temporary mobile subscriber identity TMSI of the UE.

According to a seventh aspect, an embodiment of the present invention provides an access network offloading method, including:

sending, by user equipment UE, a UE identifier and WiFi information of the UE to a base station, where the WiFi information includes a WiFi MAC ID of the UE, so that the base station sends the UE identifier and the WiFi information of the UE to a single radio controller SRC, and the SRC establishes an association relationship between the UE identifier of the UE and the WiFi MAC ID of the UE; and searching, by the UE, for a wireless local area network WLAN signal, when an accessible WLAN network is found, sending an access request including the WiFi MAC ID of the UE to an access point of the WLAN network: WLAN AP, accessing the WLAN network, and enabling the WLAN AP to send the WiFi MAC ID of the UE to the SRC, so that the SRC performs matching according to the association relationship between the UE identifier of the UE and the WiFi MAC ID of the UE, to obtain the UE identifier associated with the WiFi MAC ID, and starts offloading the UE.

In a first possible implementation manner of the seventh aspect, the WiFi information further includes a WiFi channel capacity and/or a WiFi function enabling status of the UE.

In a second possible implementation manner of the seventh aspect, the offloading of the UE includes:

bearer offloading or Internet Protocol IP flow offloading of the UE.

According to the seventh aspect or the first or second possible implementation manner of the seventh aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to an eighth aspect, an embodiment of the present invention provides an access network offloading method, including:

receiving, by a base station, a user equipment UE identifier and WiFi information of UE that are sent by the UE, where the WiFi information includes a WiFi MAC ID of the UE; and sending, by the base station, the UE identifier and the WiFi information of the UE to a single radio controller SRC, so that the SRC establishes an association relationship between the UE identifier of the UE and the WiFi MAC ID of the UE.

In a first possible implementation manner of the eighth aspect, the WiFi information further includes a WiFi channel capacity and/or a WiFi function enabling status of the UE.

According to the eighth aspect or the first possible implementation manner of the eighth aspect, in a second possible implementation manner, the UE identifier includes:

a cell radio network temporary identity CRNTI, a system architecture evolution temporary mobile subscriber identity STMSI, or a temporary mobile subscriber identity TMSI of the UE.

According to a ninth aspect, an embodiment of the present invention provides an access network offloading method, including:

receiving, by a single radio controller SRC, a user equipment UE identifier and WiFi information of UE that are sent by a base station, where the WiFi information includes a WiFi MAC ID of the UE;

establishing, by the SRC, an association relationship between the UE identifier of the UE and the WiFi MAC ID of the UE;

receiving, by the SRC, the WiFi MAC ID sent by an access point of a wireless local area network WLAN: WLAN AP, where the WiFi MAC ID is sent to the WLAN AP by the UE when the UE accesses the WLAN network; and performing, by the SRC, matching according to the association relationship between the UE identifier of the UE and the WiFi MAC ID of the UE, to obtain the UE identifier associated with the WiFi MAC ID sent by the WLAN AP, and starting offloading the UE.

In a first possible implementation manner of the ninth aspect, the WiFi information further includes a WiFi channel capacity and/or a WiFi function enabling status of the UE.

In a second possible implementation manner of the ninth aspect, the offloading of the UE includes:

bearer offloading or Internet Protocol IP flow offloading of the UE.

According to the ninth aspect or the first or second possible implementation manner of the ninth aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to a tenth aspect, an embodiment of the present invention provides an access network offloading method, including:

receiving, by an access point of a wireless local area network WLAN: WLAN AP, an access request sent by user equipment UE, where the access request includes a WiFi MAC ID of the UE; and sending, by the WLAN AP, the WiFi MAC ID of the UE to a single radio controller SRC, so that the SRC performs matching according to an association relationship between a UE identifier of the UE and the WiFi MAC ID of the UE, to obtain the UE identifier associated with the WiFi MAC ID sent by the WLAN AP, and starts offloading the UE.

In a first possible implementation manner of the tenth aspect, the offloading of the UE includes:

bearer offloading or Internet Protocol IP flow offloading of the UE.

According to the tenth aspect or the first possible implementation manner of the tenth aspect, in a second possible implementation manner, the UE identifier includes:

a cell radio network temporary identity CRNTI, a system architecture evolution temporary mobile subscriber identity STMSI, or a temporary mobile subscriber identity TMSI of the UE.

According to an eleventh aspect, an embodiment of the present invention provides user equipment UE, including:

a sending module, configured to send a UE identifier and WiFi information of the UE to a base station, where the WiFi information includes a WiFi MAC ID of the UE, so that the base station sends the UE identifier and the WiFi information of the UE to a single radio controller SRC, and the SRC establishes an association relationship between the UE identifier of the UE and the WiFi MAC ID of the UE; and a processing module, configured to search for a wireless local area network WLAN signal; where the sending module is further configured to: when an accessible WLAN network is found, send an access request including the WiFi MAC ID of the UE to an access point of the WLAN network: WLAN AP, access the WLAN network, and enable the WLAN AP to send the WiFi MAC ID of the UE to the SRC, so that the SRC performs matching according to the association relationship between the UE identifier of the UE and the WiFi MAC ID of the UE, to obtain the UE identifier associated with the WiFi MAC ID, and starts offloading the UE.

In a first possible implementation manner of the eleventh aspect, the WiFi information further includes a WiFi channel capacity and/or a WiFi function enabling status of the UE.

In a second possible implementation manner of the eleventh aspect, the offloading of the UE includes:

bearer offloading or Internet Protocol IP flow offloading of the UE.

According to the eleventh aspect or the first or second possible implementation manner of the eleventh aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to a twelfth aspect, an embodiment of the present invention provides a base station, including:

a receiving module, configured to receive a user equipment UE identifier and WiFi information of UE that are sent by the UE, where the WiFi information includes a WiFi MAC ID of the UE; and a sending module, configured to send the UE identifier and the WiFi information of the UE to a single radio controller SRC, so that the SRC establishes an association relationship between the UE identifier of the UE and the WiFi MAC ID of the UE.

In a first possible implementation manner of the twelfth aspect, the WiFi information further includes a WiFi channel capacity and/or a WiFi function enabling status of the UE.

According to the twelfth aspect or the first possible implementation manner of the twelfth aspect, in a second possible implementation manner, the UE identifier includes:

a cell radio network temporary identity CRNTI, a system architecture evolution temporary mobile subscriber identity STMSI, or a temporary mobile subscriber identity TMSI of the UE.

According to a thirteenth aspect, an embodiment of the present invention provides a single radio controller SRC, including:

a receiving module, configured to receive a user equipment UE identifier and WiFi information of UE that are sent by a base station, where the WiFi information includes a WiFi MAC ID of the UE; and a processing module, configured to establish an association relationship between the UE identifier of the UE and the WiFi MAC ID of the UE, where the receiving module is further configured to receive the WiFi MAC ID sent by an access point of a wireless local area network WLAN: WLAN AP, where the WiFi MAC ID is sent to the WLAN AP by the UE when the UE accesses the WLAN network; and the processing module is further configured to: perform matching according to the association relationship between the UE identifier of the UE and the WiFi MAC ID of the UE, to obtain the UE identifier associated with the WiFi MAC ID sent by the WLAN AP, and start offloading the UE.

In a first possible implementation manner of the thirteenth aspect, the WiFi information further includes a WiFi channel capacity and/or a WiFi function enabling status of the UE.

In a second possible implementation manner of the thirteenth aspect, the offloading of the UE includes:

bearer offloading or Internet Protocol IP flow offloading of the UE.

According to the thirteenth aspect or the first or second possible implementation manner of the thirteenth aspect, in a third possible implementation manner, the UE identifier includes:

a cell radio network temporary identity CRNTI, a system architecture evolution temporary mobile subscriber identity STMSI, or a temporary mobile subscriber identity TMSI of the UE.

According to a fourteenth aspect, an embodiment of the present invention provides an access point of a wireless local area network WLAN: WLAN AP, including:

a receiving module, configured to receive an access request sent by user equipment UE, where the access request includes a WiFi MAC ID of the UE; and a sending module, configured to send the WiFi MAC ID of the UE to an SRC, so that the SRC performs matching according to an association relationship between a UE identifier of the UE and the WiFi MAC ID of the UE, to obtain the UE identifier associated with the WiFi MAC ID sent by the WLAN AP, and starts offloading the UE.

In a first possible implementation manner of the fourteenth aspect, the offloading of the UE includes:

bearer offloading or Internet Protocol IP flow offloading of the UE.

According to the fourteenth aspect or the first possible implementation manner of the fourteenth aspect, in a second possible implementation manner, the UE identifier includes:

a cell radio network temporary identity CRNTI, a system architecture evolution temporary mobile subscriber identity STMSI, or a temporary mobile subscriber identity TMSI of the UE.

According to a fifteenth aspect, an embodiment of the present invention provides an access network offloading system, including: the base station described in Embodiment 1 of a base station of the present invention and the WLAN AP described in Embodiment 1 of an access point of a wireless local area network WLAN: WLAN AP of the present invention; or the base station described in Embodiment 2 of a base station of the present invention and the WLAN AP described in Embodiment 2 of a WLAN AP of the present invention.

According to a sixteenth aspect, an embodiment of the present invention provides an access network offloading system, including: the base station described in Embodiment 3 of a base station of the present invention, the SRC described in Embodiment 1 of a single radio controller SRC of the present invention, and the WLAN AP described in Embodiment 3 of an access point of a wireless local area network WLAN: WLAN AP of the present invention; or the base station described in Embodiment 4 of a base station of the present invention, the SRC described in Embodiment 2 of an SRC of the present invention, and the WLAN AP described in Embodiment 4 of a WLAN AP of the present invention.

According to the access network offloading method, the device, and the system that are provided in the embodiments of the present invention, UE sends a UE identifier and WiFi information of the UE to a base station, so that the base station establishes an association relationship between the UE identifier of the UE and a WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the base station, so that the base station can perform matching according to the WiFi MAC ID to obtain a corresponding UE identifier, and start offloading the UE. As can be seen, according to the method in the embodiments, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

According to the access network offloading method, the device, and the system that are provided in the embodiments of the present invention, UE forwards a UE identifier and WiFi information of the UE to an SRC by using a base station, so that the SRC establishes an association relationship between the UE identifier of the UE and a WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the SRC, so that the SRC can perform matching according to the WiFi MAC ID to obtain a corresponding UE identifier, and start offloading the UE. As can be seen, according to the method in the embodiments, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

DETAILED DESCRIPTION

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

User equipment (UE for short) in the embodiments of the present invention supports working in both Long Term Evolution (LTE for short) and a wireless local area network (WLAN for short). A base station in the embodiments of the present invention may be a node B (NodeB) or an evolved node B (eNodeB). A WLAN network mainly refers to an infrastructure, that is, UE needs to access a WLAN network by using a WLAN access point (AP for short).

A main concept of an access network offloading method provided in the embodiments of the present invention is: UE accesses a WLAN network by means of automatic search, a node of a 3GPP RAN, for example, a base station or a single radio controller (SRC for short) performs association and matching between a UE identifier of the UE and a wireless local area network Media Access Control identifier WiFi MAC ID of the UE, and when a WLAN AP reports a MAC address of the accessing UE (that is, a WiFi MAC ID of the UE), the node of the 3GPP RAN starts a process of offloading a wireless local area network controlled by an access network (RAN Controlled WLAN, RCW for short) of the UE.

Figure 1:
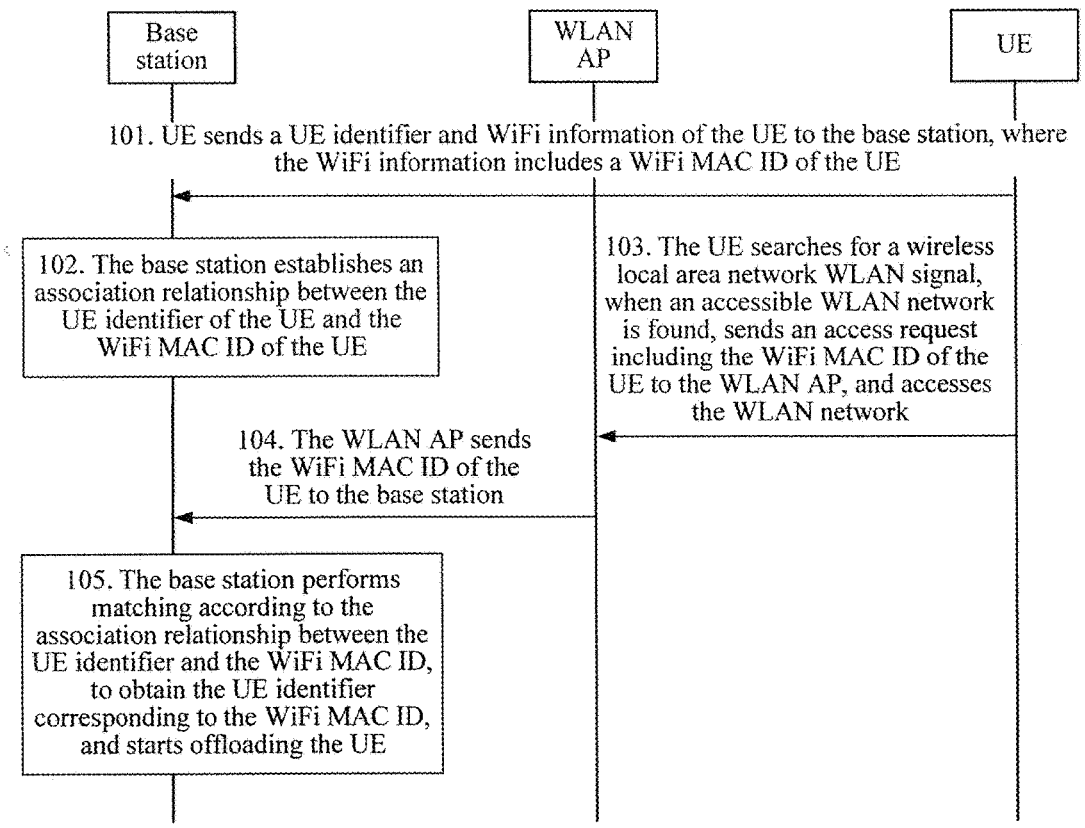
FIG. 1 is a signaling flowchart of Embodiment 1 of an access network offloading method according to the present invention.

FIG. 1 is a signaling flowchart of Embodiment 1 of an access network offloading method according to the present invention. This embodiment describes a process of interaction between UE, a base station, and a WLAN AP. In this embodiment, the base station performs association and matching between a UE identifier and a WiFi MAC ID of the UE. As shown in FIG. 1, the method in this embodiment may include:

Step 101: UE sends a UE identifier and WiFi information of the UE to a base station, where the WiFi information includes a WiFi MAC ID of the UE.

Optionally, the WiFi information may further include a WiFi channel capacity and/or a WiFi function enabling status of the UE.

Optionally, the UE identifier may be a cell radio network temporary identity (CRNTI for short), a system architecture evolution temporary mobile subscriber identity (STMSI for short), or a temporary mobile subscriber identity (TMSI for short) of the UE.

When the UE does not access a WLAN network, the UE may report the WiFi information of the UE to the base station by using an air interface.

In specific implementation, because the base station can obtain the UE identifier of the UE in a process in which the UE communicates with the base station, the UE identifier and the WiFi information may not be reported to the base station at the same time. If the base station has obtained the UE identifier of the UE, the UE may report only the WiFi information in step 101.

Step 102: The base station establishes an association relationship between the UE identifier of the UE and the WiFi MAC ID of the UE.

Step 103: The UE searches for a wireless local area network WLAN signal, when an accessible WLAN network is found, sends an access request including the WiFi MAC ID of the UE to the WLAN AP, and accesses the WLAN network.

Step 104: The WLAN AP sends the WiFi MAC ID of the UE to the base station.

Step 105: The base station performs matching according to the association relationship between the UE identifier and the WiFi MAC ID, to obtain the UE identifier associated with the WiFi MAC ID, and starts offloading the UE.

Specifically, the offloading includes bearer offloading or Internet Protocol IP flow offloading of the UE.

In this embodiment, UE sends a UE identifier and WiFi information of the UE to a base station, so that the base station establishes an association relationship between the UE identifier of the UE and a WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the base station, so that the base station can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 2:
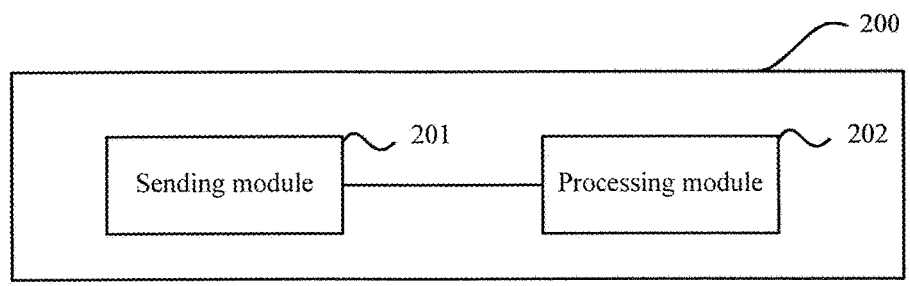
FIG. 2 is a schematic structural diagram of Embodiment 1 of UE according to the present invention.

FIG. 2 is a schematic structural diagram of Embodiment 1 of UE according to the present invention. As shown in FIG. 2, the UE 200 in this embodiment may include a sending module 201 and a processing module 202.

The sending module 201 may be configured to send a UE identifier and WiFi information of the UE to a base station, where the WiFi information includes a wireless local area network Media Access Control identifier WiFi MAC ID of the UE, so that the base station establishes an association relationship between the UE identifier of the UE and the WiFi MAC ID of the UE.

The processing module 202 may be configured to search for a wireless local area network WLAN signal.

The sending module 201 may be further configured to: when an accessible WLAN network is found, send an access request including the WiFi MAC ID of the UE to an access point of the WLAN network: WLAN AP, access the WLAN network, and enable the WLAN AP to send the WiFi MAC ID of the UE to the base station, so that the base station performs matching according to the association relationship between the UE identifier of the UE and the WiFi MAC ID of the UE, to obtain the UE identifier associated with the WiFi MAC ID, and starts offloading the UE.

Further, the WiFi information may further include a WiFi channel capacity and/or a WiFi function enabling status of the UE.

Further, the offloading may include bearer offloading or Internet Protocol IP flow offloading.

Further, the UE identifier includes a CRNTI, an STMSI, or a TMSI of the UE.

The UE in this embodiment may be configured to execute corresponding technical solutions that are executed by the UE in FIG. 1. Implementation principles thereof are similar, and details are not described herein again.

In this embodiment, UE sends a UE identifier and WiFi information of the UE to a base station, where the WiFi information includes a WiFi MAC ID of the UE, so that the base station establishes an association relationship between the UE identifier of the UE and the WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the base station, so that the base station can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 3:
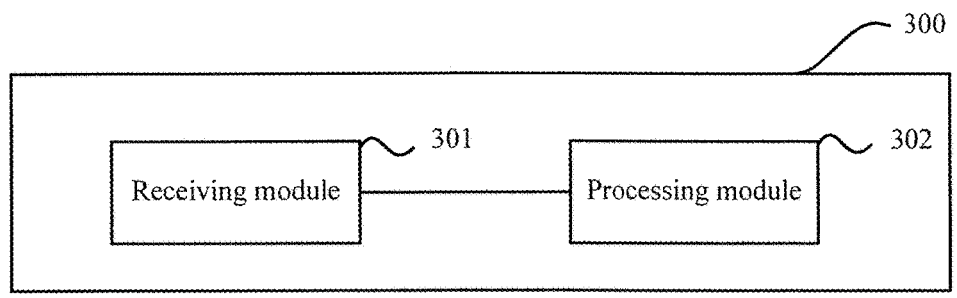
FIG. 3 is a schematic structural diagram of Embodiment 1 of a base station according to the present invention.

FIG. 3 is a schematic structural diagram of Embodiment 1 of a base station according to the present invention. As shown in FIG. 3, the base station 300 in this embodiment may include a receiving module 301 and a processing module 302.

The receiving module 301 may be configured to receive a user equipment UE identifier and WiFi information of UE that are sent by the UE, where the WiFi information includes a WiFi MAC ID of the UE.

The processing module 302 is configured to establish an association relationship between the UE identifier of the UE and the WiFi MAC ID of the UE.

The receiving module 301 may be further configured to receive the WiFi MAC ID of the UE that is sent by an access point of a wireless local area network WLAN: WLAN AP, where the WiFi MAC ID is sent to the WLAN AP by the UE when the UE accesses the WLAN network.

The processing module 302 may be further configured to: perform matching according to the association relationship between the UE identifier of the UE and the WiFi MAC ID of the UE, to obtain the UE identifier associated with the WiFi MAC ID sent by the WLAN AP, and start offloading the UE.

Further, the WiFi information further includes a WiFi channel capacity and/or a WiFi function enabling status of the UE.

Further, the offloading includes bearer offloading or Internet Protocol IP flow offloading.

Further, the UE identifier includes a CRNTI, an STMSI, or a TMSI of the UE.

The base station in this embodiment may be configured to execute corresponding technical solutions that are executed by the base station in FIG. 1. Implementation principles thereof are similar, and details are not described herein again.

In this embodiment, a base station receives a UE identifier and WiFi information of UE that are sent by the UE, where the WiFi information includes a WiFi MAC ID of the UE, and establishes an association relationship between the UE identifier of the UE and the WiFi MAC ID of the UE; in addition, when the UE accesses a WLAN network, the base station receives the WiFi MAC ID of the UE that is sent by a WLAN AP, so that the base station can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 4:
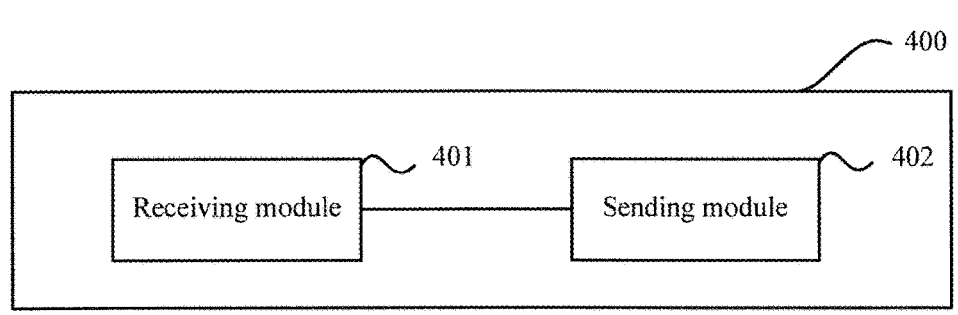
FIG. 4 is a schematic structural diagram of Embodiment 1 of a WLAN AP according to the present invention.

FIG. 4 is a schematic structural diagram of Embodiment 1 of a WLAN AP according to the present invention. As shown in FIG. 4, the WLAN AP 400 in this embodiment may include a receiving module 401 and a sending module 402.

The receiving module 401 is configured to receive an access request sent by user equipment UE, where the access request includes a WiFi MAC ID of the UE.

The sending module 402 is configured to send the WiFi MAC ID of the UE to a base station, so that the base station performs matching according to an association relationship between a UE identifier of the UE and the WiFi MAC ID of the UE, to obtain the UE identifier associated with the WiFi MAC ID sent by the WLAN AP, and starts offloading the UE.

In specific implementation, when the UE does not access a WLAN network, the UE may report the UE identifier and WiFi information of the UE to the base station by using an air interface. Therefore, after the WLAN AP sends the WiFi MAC ID of the UE to the base station, the base station can perform matching according to the association relationship between the UE identifier of the UE and the WiFi MAC ID of the UE, to obtain the UE identifier associated with the WiFi MAC ID sent by the WLAN AP, and start offloading the UE.

Further, the offloading includes bearer offloading or Internet Protocol IP flow offloading of the UE.

Further, the UE identifier may be a CRNTI, an STMSI, or a TMSI of the UE.

In this embodiment, a WLAN AP receives an access request, sent by UE that includes a WiFi MAC ID of the UE, and sends the WiFi MAC ID of the UE to a base station, so that the base station can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 5:
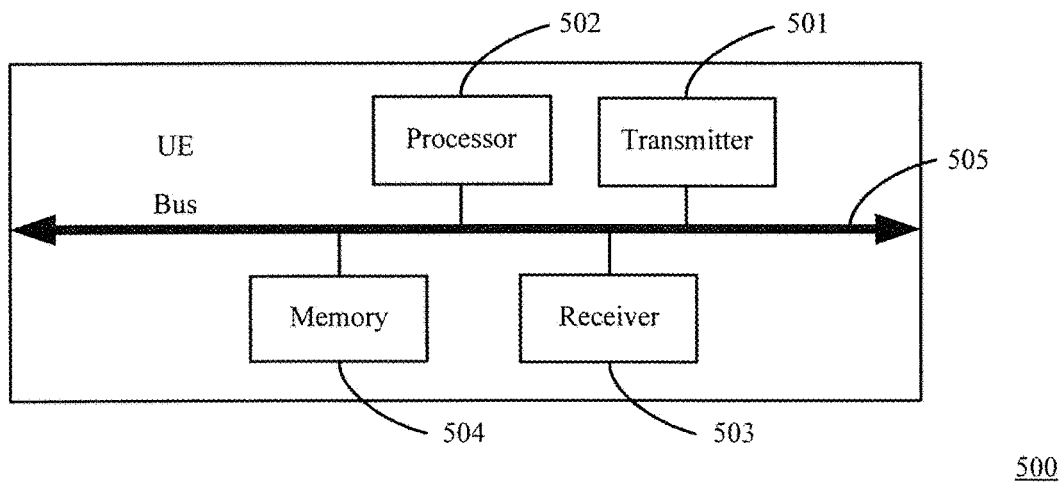
FIG. 5 is a schematic structural diagram of Embodiment 2 of UE according to the present invention.

FIG. 5 is a schematic structural diagram of Embodiment 2 of UE according to the present invention. As shown in FIG. 5, the UE 500 in this embodiment may include a transmitter 501 and a processor 502. FIG. 5 further shows a receiver 503, a memory 504, and a bus 505. The transmitter 501, the processor 502, the receiver 503, and the memory 504 are connected to and communicate with each other by using the bus 505.

The bus 505 may be an industry standard architecture (Industry Standard Architecture, ISA) bus, a peripheral component interconnect (PCI) bus, an extended industry standard architecture (EISA) bus, or the like. The bus 505 may be divided into an address bus, a data bus, a control bus, and the like. For the convenience of representation, only a bold line is used for representation in FIG. 5, but it does not represent that there is only one bus or one type of buses.

The memory 504 is configured to store executable program code, where the program code includes a computer operation instruction. The memory 504 may include a high-speed RAM memory, and may further include a non-volatile memory, for example, at least one magnetic disk storage.

The processor 502 may be a central processing unit (CPU) or an application specific integrated circuit (ASIC), or may be one or more integrated circuits configured to implement this embodiment of the present invention.

The transmitter 501 may be configured to send a UE identifier and WiFi information of the UE to a base station, where the WiFi information includes a wireless local area network Media Access Control identifier WiFi MAC ID of the UE, so that the base station establishes an association relationship between the UE identifier of the UE and the WiFi MAC ID of the UE.

The processor 502 may be configured to search for a wireless local area network WLAN signal.

The transmitter 501 may be further configured to: when an accessible WLAN network is found, send an access request including the WiFi MAC ID of the UE to an access point of the WLAN network: WLAN AP, access the WLAN network, and enable the WLAN AP to send the WiFi MAC ID of the UE to the base station, so that the base station performs matching according to the association relationship between the UE identifier of the UE and the WiFi MAC ID of the UE, to obtain the UE identifier associated with the WiFi MAC ID, and starts offloading the UE.

Further, the WiFi information may further include a WiFi channel capacity and/or a WiFi function enabling status of the UE.

Further, the offloading may include bearer offloading or Internet Protocol IP flow offloading.

Further, the UE identifier includes a CRNTI, an STMSI, or a TMSI of the UE.

The UE in this embodiment may be configured to execute corresponding technical solutions that are executed by the UE in FIG. 1. Implementation principles thereof are similar, and details are not described herein again.

In this embodiment, UE sends a UE identifier and WiFi information of the UE to a base station, where the WiFi information includes a WiFi MAC ID of the UE, so that the base station establishes an association relationship between the UE identifier of the UE and the WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the base station, so that the base station can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 6:
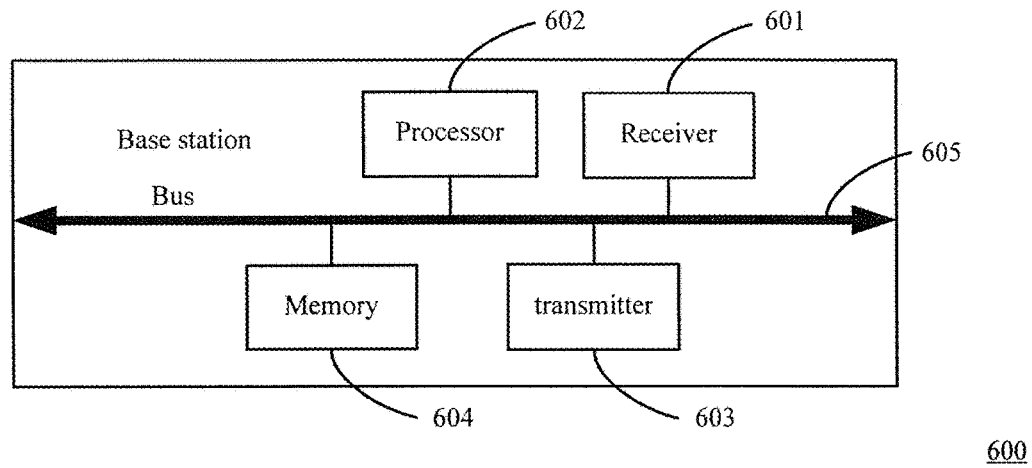
FIG. 6 is a schematic structural diagram of Embodiment 2 of a base station according to the present invention.

FIG. 6 is a schematic structural diagram of Embodiment 2 of a base station according to the present invention. As shown in FIG. 6, the base station 600 in this embodiment may include a receiver 601 and a processor 602. FIG. 6 further shows a transmitter 603, a memory 604, and a bus 605. The receiver 601, the processor 602, the transmitter 603, and the memory 604 are connected to and communicate with each other by using the bus 605.

The bus 605 may be an industry standard architecture (ISA) bus, a peripheral component interconnect (PCI) bus, an extended industry standard architecture (ISA) bus, or the like. The bus 605 may be divided into an address bus, a data bus, a control bus, and the like. For convenience of representation, only a bold line is used for representation in FIG. 6, but it does not represent that there is only one bus or one type of buses.

The memory 604 is configured to store executable program code, where the program code includes a computer operation instruction. The memory 604 may include a high-speed RAM memory, and may further include a non-volatile memory, for example, at least one magnetic disk storage.

The processor 602 may be a central processing unit (CPU) or an application specific integrated circuit (ASIC), or may be one or more integrated circuits configured to implement this embodiment of the present invention.

The receiver 601 may be configured to receive a user equipment UE identifier and WiFi information of UE that are sent by the UE, where the WiFi information includes a WiFi MAC ID of the UE.

The processor 602 is configured to establish an association relationship between the UE identifier of the UE and the WiFi MAC ID of the UE.

The receiver 601 may be further configured to receive the WiFi MAC ID of the UE that is sent by an access point of a wireless local area network WLAN: WLAN AP, where the WiFi MAC ID is sent to the WLAN AP by the UE when the UE accesses the WLAN network.

The processor 602 may be further configured to: perform matching according to the association relationship between the UE identifier of the UE and the WiFi MAC ID of the UE, to obtain the UE identifier associated with the WiFi MAC ID sent by the WLAN AP, and start offloading the UE.

Further, the WiFi information further includes a WiFi channel capacity and/or a WiFi function enabling status of the UE.

Further, the offloading includes bearer offloading or Internet Protocol IP flow offloading.

Further, the UE identifier includes a CRNTI, an STMSI, or a TMSI of the UE.

The base station in this embodiment may be configured to execute corresponding technical solutions that are executed by the base station in FIG. 1. Implementation principles thereof are similar, and details are not described herein again.

In this embodiment, a base station receives a UE identifier and WiFi information of UE that are sent by the UE, where the WiFi information includes a WiFi MAC ID of the UE, and establishes an association relationship between the UE identifier of the UE and the WiFi MAC ID of the UE; in addition, when the UE accesses a WLAN network, the base station receives the WiFi MAC ID of the UE that is sent by a WLAN AP, so that the base station can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 7:
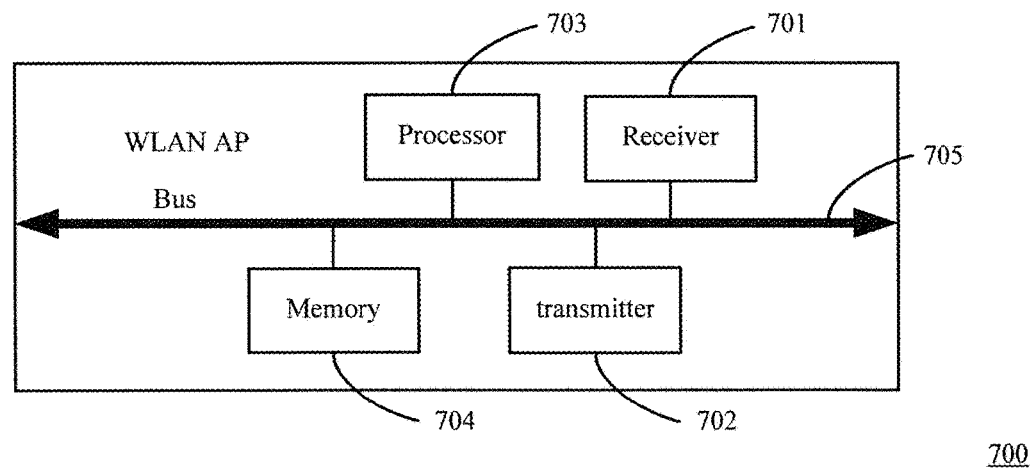
FIG. 7 is a schematic structural diagram of Embodiment 2 of a WLAN AP according to the present invention.

FIG. 7 is a schematic structural diagram of Embodiment 2 of a WLAN AP according to the present invention. As shown in FIG. 7, the WLAN AP 700 in this embodiment may include a receiver 701 and a transmitter 702. FIG. 7 further shows a processor 703, a memory 704, and a bus 705. The receiver 701, the transmitter 702, the processor 703, and the memory 704 are connected to and communicate with each other by using the bus 705.

The bus 705 may be an industry standard architecture (Industry Standard Architecture, ISA) bus, a peripheral component interconnect (PCI) bus, an extended industry standard architecture (EISA) bus, or the like. The bus 705 may be divided into an address bus, a data bus, a control bus, and the like. For convenience of representation, only a bold line is used for representation FIG. 7, but it does not represent that there is only one bus or one type of buses.

The memory 704 is configured to store executable program code, where the program code includes a computer operation instruction. The memory 704 may include a high-speed RAM memory, and may further include a non-volatile memory, for example, at least one magnetic disk storage.

The processor 703 may be a central processing unit (CPU) or an application specific integrated circuit (ASIC), or may be one or more integrated circuits configured to implement this embodiment of the present invention.

The receiver 701 is configured to receive an access request sent by user equipment UE, where the access request includes a WiFi MAC ID of the UE.

The transmitter 702 is configured to send the WiFi MAC ID of the UE to a base station, so that the base station performs matching according to an association relationship between a UE identifier of the UE and the WiFi MAC ID of the UE, to obtain the UE identifier associated with the WiFi MAC ID sent by the WLAN AP, and starts offloading the UE.

In specific implementation, when the UE does not access a WLAN network, the UE may report the UE identifier and WiFi information of the UE to the base station by using an air interface. Therefore, after the WLAN AP sends the WiFi MAC ID of the UE to the base station, the base station can perform matching according to the association relationship between the UE identifier of the UE and the WiFi MAC ID of the UE, to obtain the UE identifier associated with the WiFi MAC ID sent by the WLAN AP, and start offloading the UE.

Further, the offloading includes bearer offloading or Internet Protocol IP flow offloading of the UE.

Further, the UE identifier may be a CRNTI, an STMSI, or a TMSI of the UE.

In this embodiment, a WLAN AP receives an access request that is sent by UE and includes a WiFi MAC ID of the UE, and sends the WiFi MAC ID of the UE to a base station, so that the base station can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 8:
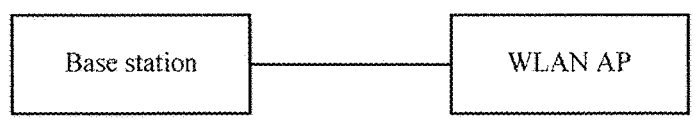
FIG. 8 is a schematic structural diagram of Embodiment 1 of an access network offloading system according to the present invention.

FIG. 8 is a schematic structural diagram of Embodiment 1 of an access network offloading system according to the present invention. As shown in FIG. 8, the system in this embodiment may include the base station in the embodiment shown in FIG. 3 or FIG. 6 and the WLAN AP in the embodiment shown in FIG. 4 or FIG. 7.

Figure 9:
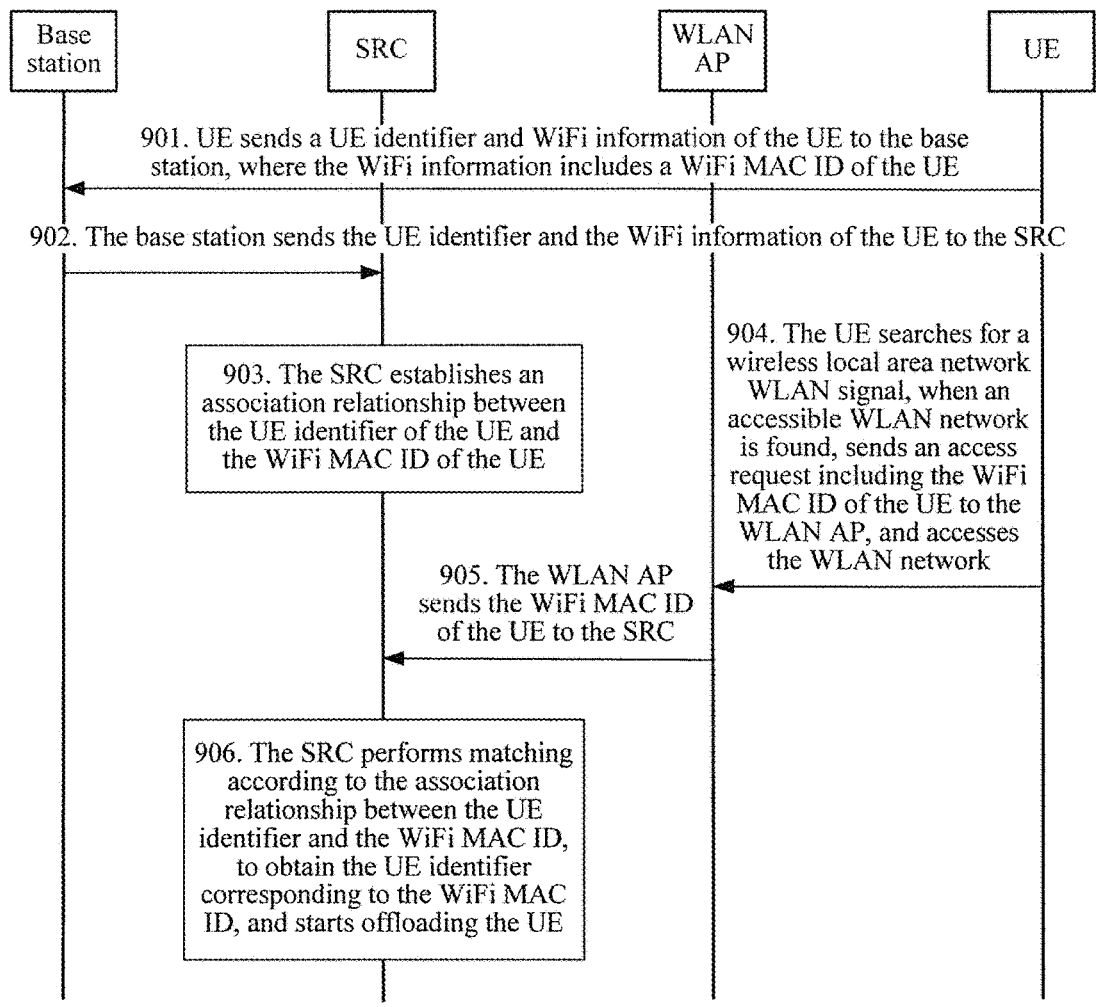
FIG. 9 is a signaling flowchart of Embodiment 2 of an access network offloading method according to the present invention.

FIG. 9 is a signaling flowchart of Embodiment 2 of an access network offloading method according to the present invention. This embodiment describes a process of interaction between a UE, a base station, an SRC, and a WLAN AP. In this embodiment, the SRC performs association and matching between a UE identifier and a WiFi MAC ID of the UE. As shown in FIG. 9, the method in this embodiment may include:

Step 901: The UE sends the UE identifier and WiFi information of the UE to the base station, where the WiFi information includes the WiFi MAC ID of the UE.

The WiFi information may further include a WiFi channel capacity and/or a WiFi function enabling status of the UE, where the WiFi channel capacity is a maximum amount of information that can be transmitted by using a WiFi channel.

The UE identifier may be a CRNTI, an STMSI, or a TMSI of the UE.

When the UE does not access a WLAN network, the UE may report the WiFi information of the UE to the base station by using an air interface.

In specific implementation, because the base station can obtain the UE identifier of the UE in a process in which the UE communicates with the base station, the UE identifier and the WiFi information may not be reported to the base station at the same time. If the base station has obtained the UE identifier of the UE, the UE may report only the WiFi information in step 901.

Step 902: The base station sends the UE identifier and the WiFi information of the UE to an SRC.

Step 903: The SRC establishes an association relationship between the UE identifier of the UE and the WiFi MAC ID of the UE.

Step 904: The UE searches for a wireless local area network WLAN signal, when an accessible WLAN network is found, sends an access request including the WiFi MAC ID of the UE to the WLAN AP, and accesses the WLAN network.

Step 905: The WLAN AP sends the WiFi MAC ID of the UE to the SRC.

Step 906: The SRC performs matching according to the association relationship between the UE identifier and the WiFi MAC ID, to obtain the UE identifier associated with the WiFi MAC ID, and starts offloading the UE.

Specifically, the offloading includes bearer offloading or Internet Protocol IP flow offloading of the UE.

In this embodiment, UE forwards a UE identifier and WiFi information of the UE to an SRC by using a base station, so that the SRC establishes an association relationship between the UE identifier of the UE and a WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the SRC, so that the SRC can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 10:
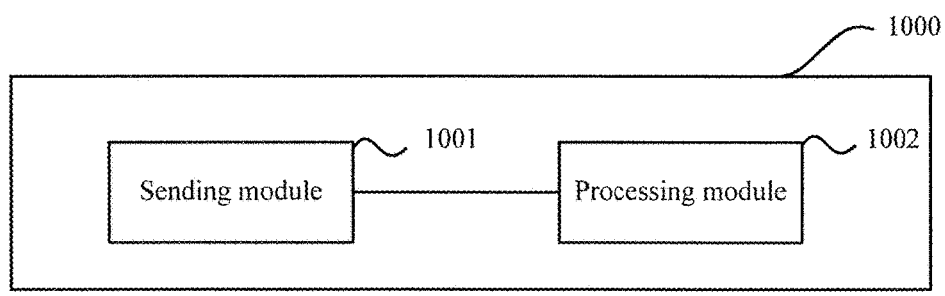
FIG. 10 is a schematic structural diagram of Embodiment 3 of UE according to the present invention.

FIG. 10 is a schematic structural diagram of Embodiment 3 of UE according to the present invention. As shown in FIG. 10, the UE 1000 in this embodiment may include a sending module 1001 and a processing module 1002.

The sending module 1001 may be configured to send a UE identifier and WiFi information of the UE to a base station, where the WiFi information includes a WiFi MAC ID of the UE, so that the base station sends the UE identifier and the WiFi information of the UE to an SRC, and the SRC establishes an association relationship between the UE identifier of the UE and the WiFi MAC ID of the UE.

The processing module 1002 may be configured to search for a wireless local area network WLAN signal.

The sending module 1001 is further configured to: when an accessible WLAN network is found, send an access request including the WiFi MAC ID of the UE to an access point of the WLAN network: WLAN AP, access the WLAN network, and enable the WLAN AP to send the WiFi MAC ID of the UE to the SRC, so that the SRC performs matching according to the association relationship between the UE identifier of the UE and the WiFi MAC ID of the UE, to obtain the UE identifier associated with the WiFi MAC ID, and starts offloading the UE.

Further, the WiFi information further includes a WiFi channel capacity and/or a WiFi function enabling status of the UE.

Further, the offloading of the UE includes:
bearer offloading or Internet Protocol IP flow offloading of the UE.

Further, the UE identifier includes a CRNTI, an STMSI, or a TMSI of the UE.

The UE in this embodiment may be configured to execute corresponding technical solutions that are executed by the UE in the method embodiment shown in FIG. 9. Implementation principles thereof are similar, and details are not described herein again.

In this embodiment, UE sends a UE identifier and WiFi information of the UE to a base station, where the WiFi information includes a WiFi MAC ID of the UE, and forwards the UE identifier and the WiFi information to an SRC by using the base station, so that the SRC establishes an association relationship between the UE identifier of the UE and the WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the SRC, so that the SRC can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 11:
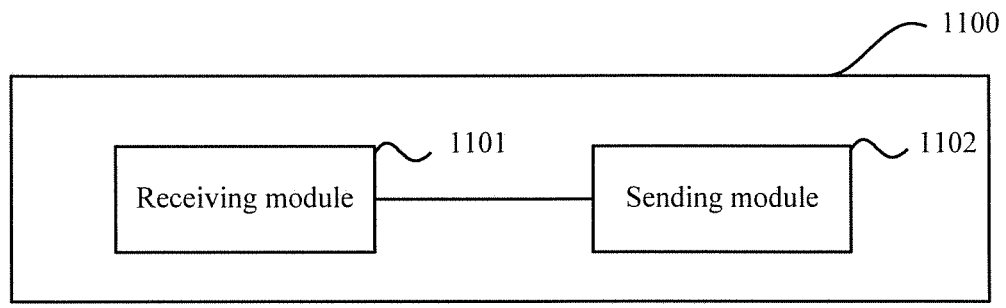
FIG. 11 is a schematic structural diagram of Embodiment 3 of a base station according to the present invention.

FIG. 11 is a schematic structural diagram of Embodiment 3 of a base station according to the present invention. As shown in FIG. 11, the base station 1100 in this embodiment may include a receiving module 1101 and a sending module 1102.

The receiving module 1101 may be configured to receive a user equipment UE identifier and WiFi information of UE that are sent by the UE, where the WiFi information includes a WiFi MAC ID of the UE.

The sending module 1102 may be configured to send the UE identifier and the WiFi information of the UE to an SRC, so that the SRC establishes an association relationship between the UE identifier of the UE and the WiFi MAC ID of the UE.

Further, the WiFi information further includes a WiFi channel capacity and/or a WiFi function enabling status of the UE.

Further, the UE identifier includes a CRNTI, an STMSI, or a TMSI of the UE.

The base station in this embodiment may be configured to execute corresponding technical solutions that are executed by the base station in the method embodiment shown in FIG. 9. Implementation principles thereof are similar, and details are not described herein again.

In this embodiment, a base station receives a UE identifier and WiFi information of UE that are sent by the UE, where the WiFi information includes a WiFi MAC ID of the UE, and forwards the UE identifier and the WiFi information to an SRC, so that the SRC establishes an association relationship between the UE identifier of the UE and the WiFi MAC ID of the UE. Therefore, when the UE accesses a WLAN network, the SRC can perform matching according to the association relationship to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 12:
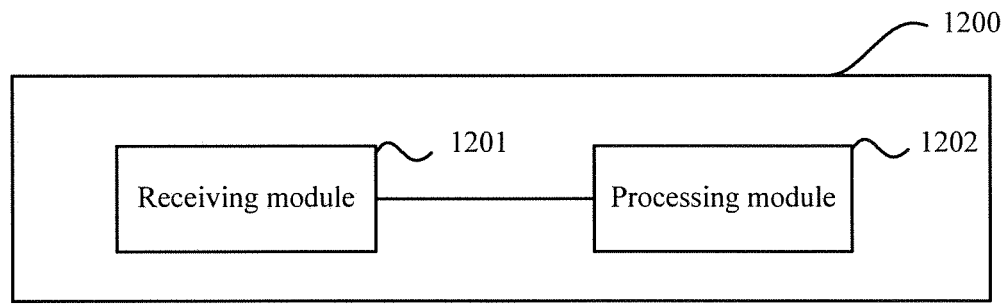
FIG. 12 is a schematic structural diagram of Embodiment 1 of an SRC according to the present invention.

FIG. 12 is a schematic structural diagram of Embodiment 1 of an SRC according to the present invention. As shown in FIG. 12, the SRC 1200 in this embodiment may include a receiving module 1201 and a processing module 1202.

The receiving module 1201 is configured to receive a user equipment UE identifier and WiFi information of UE that are sent by a base station, where the WiFi information includes a WiFi MAC ID of the UE.

The processing module 1202 is configured to establish an association relationship between the UE identifier of the UE and the WiFi MAC ID of the UE.

The receiving module 1201 is further configured to receive the WiFi MAC ID sent by an access point of a wireless local area network WLAN: WLAN AP, where the WiFi MAC ID is sent to the WLAN AP by the UE when the UE accesses the WLAN network.

The processing module 1202 is further configured to: perform matching according to the association relationship between the UE identifier of the UE and the WiFi MAC ID of the UE, to obtain the UE identifier associated with the WiFi MAC ID sent by the WLAN AP, and start offloading the UE.

Further, the WiFi information further includes a WiFi channel capacity and/or a WiFi function enabling status of the UE.

Further, the offloading of the UE includes bearer offloading or Internet Protocol IP flow offloading of the UE.

Further, the UE identifier includes a CRNTI, an STMSI, or a TMSI of the UE.

The SRC in this embodiment may be configured to execute corresponding technical solutions that are executed by the SRC in the method embodiment shown in FIG. 9. Implementation principles thereof are similar, and details are not described herein again.

In this embodiment, an SRC receives a UE identifier and WiFi information that are sent by a base station, and establishes an association relationship between the UE identifier of the UE and a WiFi MAC ID of the UE; in addition, when the UE accesses a WLAN network, the SRC can perform matching according to the association relationship and the WiFi MAC ID of the UE that is sent by a WLAN AP, to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 13:
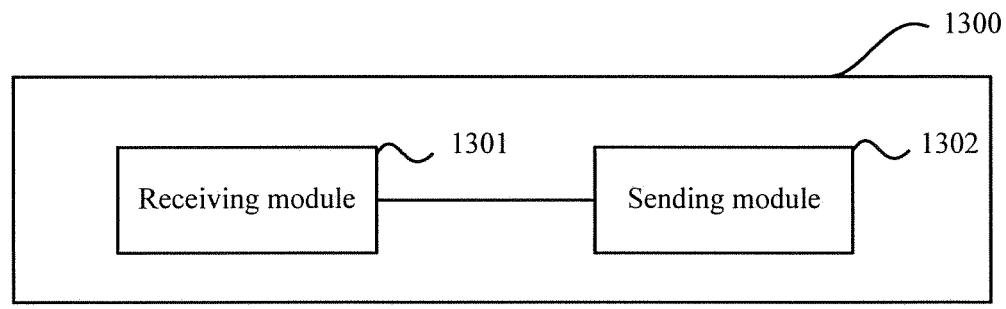
FIG. 13 is a schematic structural diagram of Embodiment 3 of a WLAN AP according to the present invention.

FIG. 13 is a schematic structural diagram of Embodiment 3 of a WLAN AP according to the present invention. As shown in FIG. 13, the WLAN AP 1300 in this embodiment may include a receiving module 1301 and a sending module 1302.

The receiving module 1301 is configured to receive an access request sent by user equipment UE, where the access request includes a WiFi MAC ID of the UE.

The sending module 1302 is configured to send the WiFi MAC ID of the UE to an SRC, so that the SRC performs matching according to an association relationship between a UE identifier of the UE and the WiFi MAC ID of the UE, to obtain the UE identifier associated with the WiFi MAC ID sent by the WLAN AP, and starts offloading the UE.

Further, the WiFi information further includes a WiFi channel capacity and/or a WiFi function enabling status of the UE.

Further, the offloading of the UE includes bearer offloading or Internet Protocol IP flow offloading of the UE.

Further, the UE identifier includes a CRNTI, an STMSI, or a TMSI of the UE.

The WLAN AP in this embodiment may be configured to execute corresponding technical solutions that are executed by the WLAN AP in the method embodiment shown in FIG. 9. Implementation principles thereof are similar, and details are not described herein again.

In this embodiment, a WLAN AP receives an access request that is sent by UE and includes a WiFi MAC ID of the UE, and sends the WiFi MAC ID of the UE to an SRC, so that the SRC can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 14:
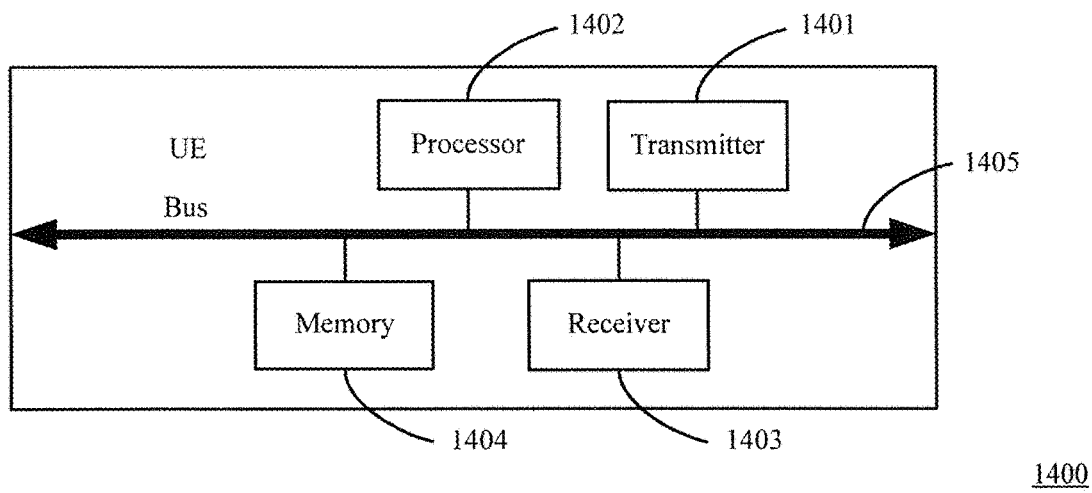
FIG. 14 is a schematic structural diagram of Embodiment 4 of UE according to the present invention.

FIG. 14 is a schematic structural diagram of Embodiment 4 of UE according to the present invention. As shown in FIG. 14, the UE 1400 in this embodiment may include a transmitter 1401 and a processor 1402. FIG. 14 further shows a receiver 1403, a memory 1404, and a bus 1405. The transmitter 1401, the processor 1402, the receiver 1403, and the memory 1404 are connected to and communicate with each other by using the bus 1405.

The bus 1405 may be an industry standard architecture (ISA) bus, a peripheral component interconnect (PCI) bus, an extended industry standard architecture (EISA) bus, or the like. The bus 1405 may be divided into an address bus, a data bus, a control bus, and the like. For convenience of representation, only a bold line is used for representation in FIG. 14, but it does not represent that there is only one bus or one type of buses.

The memory 1404 is configured to store executable program code, where the program code includes a computer operation instruction. The memory 1404 may include a high-speed RAM memory, and may further include a non-volatile memory, for example, at least one magnetic disk storage.

The processor 1402 may be a central processing unit (CPU) or an application specific integrated circuit (ASIC), or may be one or more integrated circuits configured to implement this embodiment of the present invention.

The transmitter 1401 may be configured to send a UE identifier and WiFi information of the UE to a base station, where the WiFi information includes a WiFi MAC ID of the UE, so that the base station sends the UE identifier and the WiFi information of the UE to an SRC, and the SRC establishes an association relationship between the UE identifier of the UE and the WiFi MAC ID of the UE.

The processor 1402 may be configured to search for a wireless local area network WLAN signal.

The transmitter 1401 is further configured to: when an accessible WLAN network is found, send an access request including the WiFi MAC ID of the UE to an access point of the WLAN network: WLAN AP, access the WLAN network, and enable the WLAN AP to send the WiFi MAC ID of the UE to the SRC, so that the SRC performs matching according to the association relationship between the UE identifier of the UE and the WiFi MAC ID of the UE, to obtain the UE identifier associated with the WiFi MAC ID, and starts offloading the UE.

Further, the WiFi information further includes a WiFi channel capacity and/or a WiFi function enabling status of the UE.

Further, the offloading of the UE includes:

bearer offloading or Internet Protocol IP flow offloading of the UE.

Further, the UE identifier includes a CRNTI, an STMSI, or a TMSI of the UE.

The UE in this embodiment may be configured to execute corresponding technical solutions that are executed by the UE in the method embodiment shown in FIG. 9. Implementation principles thereof are similar, and details are not described herein again.

In this embodiment, UE sends a UE identifier and WiFi information of the UE to a base station, where the WiFi information includes a WiFi MAC ID of the UE, and forwards the UE identifier and the WiFi information to an SRC by using the base station, so that the SRC establishes an association relationship between the UE identifier of the UE and the WiFi MAC ID of the UE; in addition, when the UE accesses a WLAN network, the UE sends an access request including the WiFi MAC ID of the UE to a WLAN AP, and the WLAN AP sends the WiFi MAC ID of the UE to the SRC, so that the SRC can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 15:
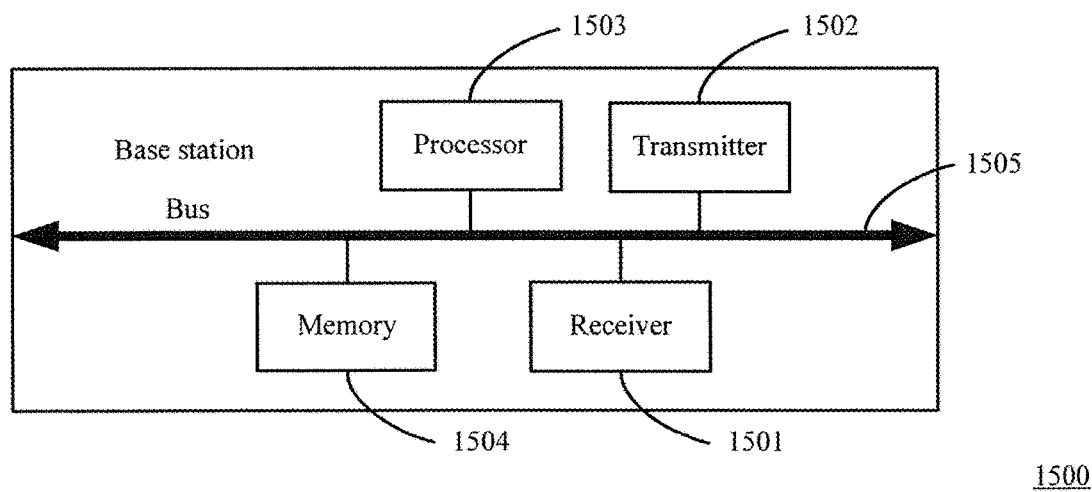
FIG. 15 is a schematic structural diagram of Embodiment 4 of a base station according to the present invention.

FIG. 15 is a schematic structural diagram of Embodiment 4 of a base station according to the present invention. As shown in FIG. 15, the base station 1500 in this embodiment may include a receiver 1501 and a transmitter 1502. FIG. 15 further shows a processor 1503, a memory 1504, and a bus 1505. The receiver 1501, the transmitter 1502, the processor 1503, and the memory 1504 are connected to and communicate with each other by using the bus 1505.

The bus 1505 may be an industry standard architecture (ISA) bus, a peripheral component interconnect (PCI) bus, an extended industry standard architecture (EISA) bus, or the like. The bus 1505 may be divided into an address bus, a data bus, a control bus, and the like. For convenience of representation, only a bold line is used for representation in FIG. 15, but it does not represent that there is only one bus or one type of buses.

The memory 1504 is configured to store executable program code, where the program code includes a computer operation instruction. The memory 1504 may include a high-speed RAM memory, and may further include a non-volatile memory, for example, at least one magnetic disk storage.

The processor 1503 may be a central processing unit (CPU) or an application specific integrated circuit (ASIC), or may be one or more integrated circuits configured to implement this embodiment of the present invention.

The receiver 1501 may be configured to receive a user equipment UE identifier and WiFi information of UE that are sent by the UE, where the WiFi information includes a WiFi MAC ID of the UE.

The transmitter 1502 may be configured to send the UE identifier and the WiFi information of the UE to an SRC, so that the SRC establishes an association relationship between the UE identifier of the UE and the WiFi MAC ID of the UE.

Further, the WiFi information further includes a WiFi channel capacity and/or a WiFi function enabling status of the UE.

Further, the UE identifier includes a CRNTI, an STMSI, or a TMSI of the UE.

The base station in this embodiment may be configured to execute corresponding technical solutions that are executed by the base station in the method embodiment shown in FIG. 9. Implementation principles thereof are similar, and details are not described herein again.

In this embodiment, a base station receives a UE identifier and WiFi information of UE that are sent by the UE, where the WiFi information includes a WiFi MAC ID of the UE, and forwards the UE identifier and the WiFi information to an SRC, so that the SRC establishes an association relationship between the UE identifier of the UE and the WiFi MAC ID of the UE. Therefore, when the UE accesses a WLAN network, the SRC can perform matching according to the association relationship to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 16:
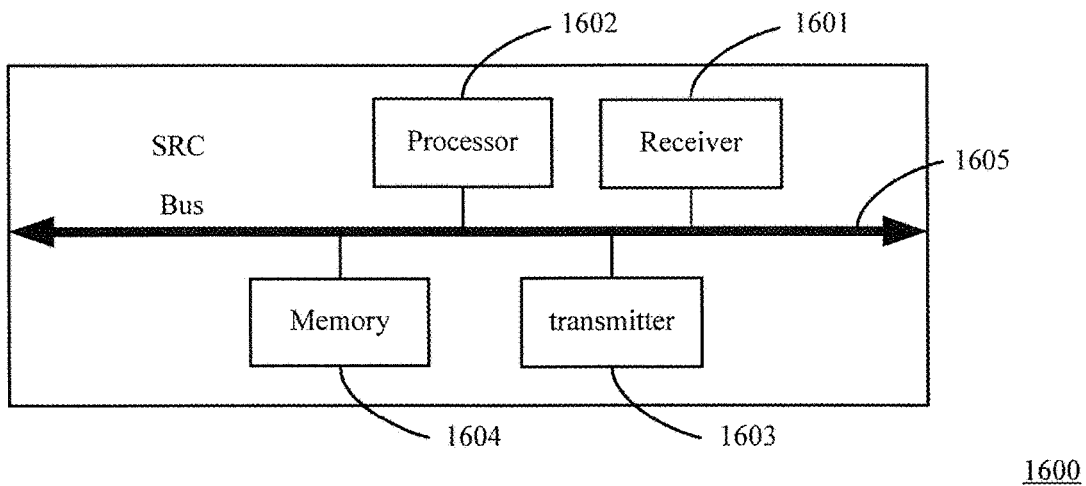
FIG. 16 is a schematic structural diagram of Embodiment 2 of an SRC according to the present invention.

FIG. 16 is a schematic structural diagram of Embodiment 2 of an SRC according to the present invention. As shown in FIG. 16, the SRC 1600 in this embodiment may include a receiver 1601 and a processor 1602. FIG. 16 further shows a transmitter 1603, a memory 1604, and a bus 1605. The receiver 1601, the processor 1602, the transmitter 1603, and the memory 1604 are connected to and communicate with each other by using the bus 1605.

The bus 1605 may be an industry standard architecture (ISA) bus, a peripheral component interconnect (PCI) bus, an extended industry standard architecture (EISA) bus, or the like. The bus 1605 may be divided into an address bus, a data bus, a control bus, and the like. For convenience of representation, only a bold line is used for representation in FIG. 16, but it does not represent that there is only one bus or one type of buses.

The memory 1604 is configured to store executable program code, where the program code includes a computer operation instruction. The memory 1604 may include a high-speed RAM memory, and may further include a non-volatile memory, for example, at least one magnetic disk storage.

The processor 1602 may be a central processing unit (CPU) or an application specific integrated circuit (ASIC), or may be one or more integrated circuits configured to implement this embodiment of the present invention.

The receiver 1601 is configured to receive a user equipment UE identifier and WiFi information of UE that are sent by a base station, where the WiFi information includes a WiFi MAC ID of the UE.

The processor 1602 is configured to establish an association relationship between the UE identifier of the UE and the WiFi MAC ID of the UE.

The receiver 1601 is further configured to receive the WiFi MAC ID sent by a WLAN AP, where the WiFi MAC ID is sent to the WLAN AP by the UE when the UE accesses a WLAN network.

The processor 1602 is further configured to: perform matching according to the association relationship between the UE identifier of the UE and the WiFi MAC ID of the UE, to obtain the UE identifier associated with the WiFi MAC ID sent by the WLAN AP, and start offloading the UE.

Further, the WiFi information further includes a WiFi channel capacity and/or a WiFi function enabling status of the UE.

Further, the offloading of the UE includes bearer offloading or Internet Protocol IP flow offloading of the UE.

Further, the UE identifier includes a CRNTI, an STMSI, or a TMSI of the UE.

The SRC in this embodiment may be configured to execute corresponding technical solutions that are executed by the SRC in the method embodiment in FIG. 9. Implementation principles thereof are similar, and details are not described herein again.

In this embodiment, an SRC receives a UE identifier and WiFi information that are sent by a base station, and establishes an association relationship between the UE identifier of the UE and a WiFi MAC ID of the UE; in addition, when the UE accesses a WLAN network, the SRC can perform matching according to the association relationship and the WiFi MAC ID of the UE that is sent by a WLAN AP, to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 17:
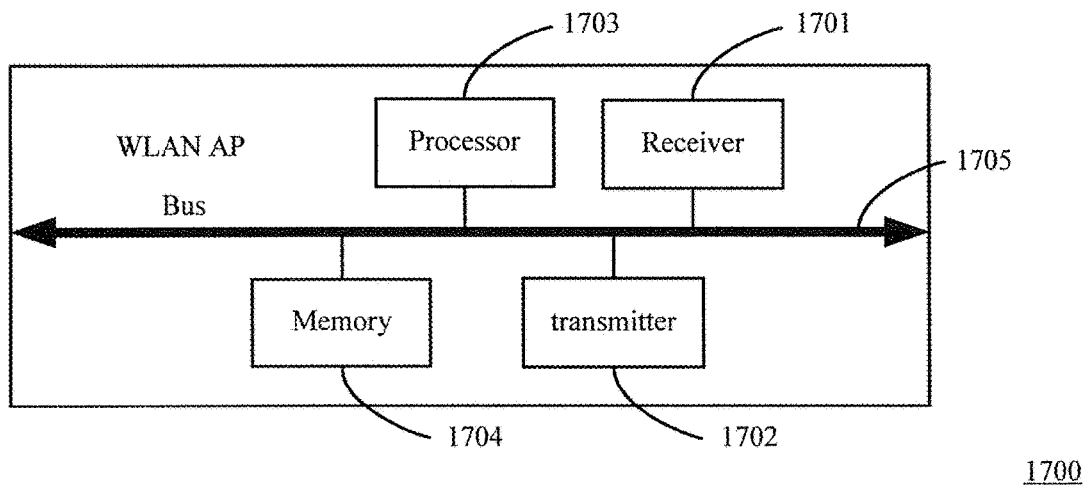
FIG. 17 is a schematic structural diagram of Embodiment 4 of a WLAN AP according to the present invention.

FIG. 17 is a schematic structural diagram of Embodiment 4 of a WLAN AP according to the present invention. As shown in FIG. 17, the WLAN AP 1700 in this embodiment may include a receiver 1701 and a transmitter 1702. FIG. 17 further shows a processor 1703, a memory 1704, and a bus 1705. The receiver 1701, the transmitter 1702, the processor 1703, and the memory 1704 are connected to and communicate with each other by using the bus 1705.

The bus 1705 may be an industry standard architecture (ISA) bus, a peripheral component interconnect (PCI) bus, an extended industry standard architecture (EISA) bus, or the like. The bus 1705 may be divided into an address bus, a data bus, a control bus, and the like. For convenience of representation, only a bold line is used for representation in FIG. 17, but it does not represent that there is only one bus or one type of buses.

The memory 1704 is configured to store executable program code, where the program code includes a computer operation instruction. The memory 1704 may include a high-speed RAM memory, and may further include a non-volatile memory, for example, at least one magnetic disk storage.

The processor 1703 may be a central processing unit (CPU) or an application specific integrated circuit (ASIC), or may be one or more integrated circuits configured to implement this embodiment of the present invention.

The receiver 1701 is configured to receive an access request sent by user equipment UE, where the access request includes a WiFi MAC ID of the UE.

The transmitter 1702 is configured to send the WiFi MAC ID of the UE to an SRC, so that the SRC performs matching according to an association relationship between a UE identifier of the UE and the WiFi MAC ID of the UE, to obtain the UE identifier associated with the WiFi MAC ID sent by the WLAN AP, and starts offloading the UE.

Further, the WiFi information further includes a WiFi channel capacity and/or a WiFi function enabling status of the UE.

Further, the offloading of the UE includes bearer offloading or Internet Protocol IP flow offloading of the UE.

Further, the UE identifier includes a CRNTI, an STMSI, or a TMSI of the UE.

The WLAN AP in this embodiment may be configured to execute corresponding technical solutions that are executed by the WLAN AP in the method embodiment shown in FIG. 9. Implementation principles thereof are similar, and details are not described herein again.

In this embodiment, a WLAN AP receives an access request that is sent by UE and includes a WiFi MAC ID of the UE, and sends the WiFi MAC ID of the UE to an SRC, so that the SRC can perform matching according to the WiFi MAC ID to obtain a corresponding UE identifier, and start offloading the UE. As can be seen, according to the method in this embodiment, when the UE accesses the WLAN network, the base station is triggered to start offloading the UE; the UE may access the WLAN network by means of a normal access process, and the WLAN AP does not need to detect UL Sounding sent by the UE, thereby avoiding a problem of increased costs of the WLAN AP caused by adding an uplink detector to the WLAN AP.

Figure 18:
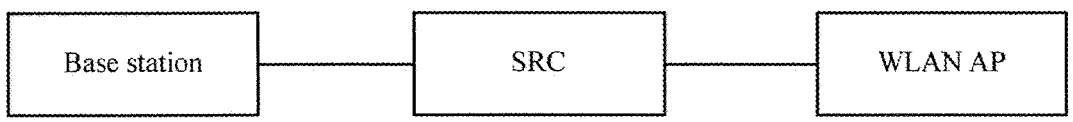
FIG. 18 is a schematic structural diagram of Embodiment 2 of an access network offloading system according to the present invention.

FIG. 18 is a schematic structural diagram of Embodiment 2 of an access network offloading system according to the present invention. As shown in FIG. 18, the system in this embodiment may include the base station in the embodiment shown in FIG. 11 or FIG. 15, the SRC in the embodiment shown in FIG. 12 or FIG. 16, and the WLAN AP in the embodiment shown in FIG. 13 or FIG. 17.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An access network offloading method, comprising:
    receiving, by a base station, a user equipment (UE) identifier and WiFi information of a UE from the UE, wherein the WiFi information comprises a wireless local area network Media Access Control identifier (WiFi MAC ID) of the UE;
    establishing, by the base station, an association relationship between the UE identifier of the UE and the WiFi MAC ID of the UE;
    receiving, by the base station, the WiFi MAC ID of the UE from a wireless local area network (WLAN) access point (WLAN AP), wherein the WiFi MAC ID is sent to the WLAN AP by the UE when the UE accesses the WLAN network;

performing, by the base station, matching according to the association relationship between the UE identifier of the UE and the WiFi MAC ID of the UE, to obtain the UE identifier associated with the WiFi MAC ID sent by the WLAN AP; and offloading the UE.

2. The method according to claim 1, wherein the WiFi information further comprises at least one of a WiFi channel capacity or a WiFi function enabling status of the UE.

3. The method according to claim 1, wherein offloading comprises:

bearer offloading or Internet Protocol (IP) flow offloading.

4. The method according to claim 1, wherein the UE identifier comprises:

a cell radio network temporary identity (CRNTI), a system architecture evolution temporary mobile subscriber identity (STMSI), or a temporary mobile subscriber identity (TMSI) of the UE.

5. A base station, comprising:

a receiver, configured to:
  receive a user equipment (UE) identifier and WiFi information of a UE that are sent by the UE, wherein the WiFi information comprises a wireless local area network Media Access Control identifier (WiFi MAC ID) of the UE, and
  receive the WiFi MAC ID of the UE that is sent by a wireless local area network (WLAN) access point (WLAN AP), wherein the WiFi MAC ID is sent to the WLAN AP by the UE when the UE accesses the WLAN network; and a processor, configured to:
  establish an association relationship between the UE identifier of the UE and the WiFi MAC ID of the UE,
  perform matching according to the association relationship between the UE identifier of the UE and the WiFi MAC ID of the UE, to obtain the UE identifier associated with the WiFi MAC ID sent by the WLAN AP, and
  offload the UE.

6. The base station according to claim 5, wherein the WiFi information further comprises at least one of a WiFi channel capacity and or WiFi function enabling status of the UE.

7. The base station according to claim 5, wherein the processor is further configured to:

perform bearer offloading or Internet Protocol IP flow offloading.

8. The base station according to claim 5, wherein the UE identifier comprises:

a cell radio network temporary identity (CRNTI), a system architecture evolution temporary mobile subscriber identity (STMSI), or a temporary mobile subscriber identity (TMSI) of the UE.

9. An access network offloading system, comprising:

a base station configured to:
  receive a user equipment (UE) identifier and WiFi information of a UE from the UE, wherein the WiFi information comprises a wireless local area network Media Access Control identifier (WiFi MAC ID) of the UE,
  establish an association relationship between the UE identifier of the UE and the WiFi MAC ID of the UE,
  perform matching according to the association relationship between the UE identifier of the UE and the WiFi MAC ID of the UE, to obtain the UE identifier associated with the WiFi MAC ID sent by the WLAN AP, and
  offload the UE; and a wireless local area network (WLAN) access point (WLAN AP) configured to:
  receive an access request from the UE, wherein the access request comprises the WiFi MAC ID of the UE, and send, the WiFi MAC ID of the UE to a base station.

10. The system according to claim 9, wherein the WiFi information further comprises at least one of a WiFi channel capacity or a WiFi function enabling status of the UE.

11. The system according to claim 9, wherein the base station is further configured to:

perform bearer offloading or Internet Protocol (IP) flow offloading.

12. The system according to claim 9, wherein the UE identifier comprises:

a cell radio network temporary identity (CRNTI), a system architecture evolution temporary mobile subscriber identity (STMSI), or a temporary mobile subscriber identity (TMSI) of the UE.

* * * * *